United States Patent [19]
Crumrine et al.

[11] Patent Number: 5,435,095
[45] Date of Patent: Jul. 25, 1995

[54] BORED RIGID SPLIT SHOT SINKER

[76] Inventors: Douglas L. Crumrine, 5333 Lynden Ave., Grand Island, Nebr. 68801; Steven G. Crumrine, 120 Beechwood Dr., Grand Island, Nebr. 68803

[21] Appl. No.: 288,619

[22] Filed: Aug. 10, 1994

[51] Int. Cl.$^6$ ............................................. H01K 95/00
[52] U.S. Cl. ..................................................... 43/44.9
[58] Field of Search .................... 43/44.9, 44.89, 42.36, 43/44.87; D22/145

[56] References Cited

U.S. PATENT DOCUMENTS

| | | | |
|---|---|---|---|
| 2,315,322 | 3/1943 | Fenley | 43/44.9 |
| 2,701,427 | 2/1955 | Vironda | 43/44.89 |
| 3,043,043 | 7/1962 | Parry | 43/43.1 |
| 3,192,662 | 7/1965 | Hoyle | 43/44.91 |
| 4,351,128 | 9/1982 | Sivertsen | 43/44.91 |
| 4,693,031 | 5/1987 | Koetje | 43/44.91 |
| 4,796,377 | 1/1989 | Hosegood et al. | 43/44.88 |
| 4,891,903 | 1/1990 | Wymore | 43/44.89 |
| 5,239,770 | 8/1993 | Kohus | 43/44.91 |

FOREIGN PATENT DOCUMENTS 2207841 2/1989 United Kingdom .

Primary Examiner—P. Austin Bradley
Assistant Examiner—Jeanne M. Elpel
Attorney, Agent, or Firm—John A. Beehner

[57] ABSTRACT

A sinker for attachment to a fishing line includes a generally spherical, generally rigid solid body having a radius and first and second generally V-shaped radial slots in the solid body, each of the slots having opposite end portions. The radial slots are arranged generally opposite one another on the body and each radial slot further includes a base having a transfer extent sufficient to accept at least two runs of fishing line side-by-side. A bore hole having opposite ends extends through the body and connects the first and second radial slots. Finally, the ends of the bore hole and the end portions of the radial slots are contoured such that fishing line running through the bore hole and radial slots will not become frayed or kinked resulting in a loss of line tensile strength.

7 Claims, 1 Drawing Sheet

BORED RIGID SPLIT SHOT SINKER

BACKGROUND OF THE INVENTION

1. Technical Field

This invention relates to a sinker for attachment to a fishing line and, more particularly, to a generally spherical, generally rigid stainless steel sinker having two V-shaped radial slots formed therein, the slots being connected by a bore hole which extends generally along a diameter of the sinker.

2. Description of the Prior Art

Fishermen have been using weights or "sinkers" as both means for sending fish bait to the bottom of the particular body of water being fished and to allow a fisherman to cast his line outward from his position, thus allowing him to fish a greater expanse of water. The very first sinkers were most likely stones tied to the fisherman's line. Of course, these tie-on weights often fell off the line and had to be replaced. As the level of fishing technology increased, various other types of sinkers were developed, including rubber-core sinkers, split-shot crimp sinkers and other kinds too numerous to mention. These weights or sinkers are commonly constructed of lead, due to its availability and malleability.

There are numerous disadvantages encountered when certain types of sinkers described above are used. Of these, however, the present invention is concerned with improving the standard split-shot lead sinker used by light tackle fisherman the world over. One of the main problems encountered with split-shot sinkers is that for the sinker to be placed on the fishing line, the sinker is "crimped" onto the line by closing the deep V-shaped notch in the split-shot sinker. The notch is closed by the use of pliers or finger pressure, depending upon the malleability of the lead alloy used in making the split-shot sinker. However, this crimping of the sinker can damage the fishing line on which it is placed, specifically by the rough or sharp edges of the sinker notch. The tensile strength of the fishing line may thus be lessened to the point that line breakage occurs when a fish is hooked. It is desirable, therefore, to replace the crimping method of attaching a split-sinker to a fishing line with an alternative method which will not decrease the tensile strength of the fishing line.

Two examples found in the prior art attempt to solve the problem presented above. Parry, U.S. Pat. No. 3,043,043, discloses a fishing line attachment which does not include the crimping of the sinker to secure the weight on the fishing line. Parry instead provides two hemispherical sections each having two raised portions on the flat surfaces thereof. The raised portion of the each hemisphere contacts the raised portions on the opposite hemisphere and are secured thereto. Fishing line is looped between the raised sections and around the hemispheres, thus securing the fishing line attachment to the fishing line. The disadvantages of Parry are numerous, however, including the fact that the channel between the two hemispherical sections is narrow, thus making it difficult to extend the fishing line between the two hemispheres. Additionally, as very little of the fishing line is exposed when wrapped around the projections, it can be very difficult to grip the fishing line to remove the fishing line attachment from the fishing line. The present invention seeks to address and correct those disadvantages disclosed in Parry.

Another example found in the prior art is Hosegood et al., U.S. Pat. No. 4,796,377, which discloses a shaped cleat or weight having a body with one or more grooves for location of the line provided around the main body and one or more holes passing from the line guide through the center of the cleat and out the other side. Disadvantages of Hosegood include the fact that the groove provided for securing the line is shallow and the fishing line may easily slip off of the cleat. Additionally, the sharp-edged nature of the connection between the hole and groove can cause fraying or kinking of the fishing line. There is therefore a need for a fishing line weight which addresses and corrects each of the above-described disadvantages.

Presently, lead is the preferred construction material for sinkers, due to its malleability and easy availability. Lead sinkers are commonly manufactured by injection of molten lead into the properly designed mold. However, this manufacturing process has obvious human problems such as the susceptibility of transferring some toxic fumes from the molten lead into the area of the manufacturing process. Additionally, this injection molding manufacturing process leaves a residual gate which must be trimmed from the sinker prior to packing and sale of the sinker. In addition to various manufacturing problems described above, numerous environmental hazards are also involved with the use of lead sinkers. For example, due to the tendency of small sinkers to become separated from the fishing line, the sinkers may be ingested by wildlife such as ducks, birds, fish and the like. The lead sinkers then dissolve in the stomach of the creature, thus contaminating the animal's system with lead. If such contaminated animals or even by humans, the lead contamination may be passed thus contaminating the human eating the animal. In recognition of this danger, the United States Environmental Protection Agency has recently promulgated a rule which will require that all lead sinkers having an overall length of 1" or less be removed from the market. Whether or not sinkers made of lead ultimately be outlawed. They may be made less favored or absolute in the market due to the improved sinker of the present invention.

It is therefore an object of the present invention to provide an improved sinker for attachment to a fishing line.

Another object is to provide a sinker which may be attached to a fishing line without "crimping" of the sinker, which can result in damage to the line.

Another object of the present invention is to provide a sinker which is constructed of stainless steel instead of lead to prevent the possibility of lead contamination in animals which ingest the lead sinkers.

Another object of the present invention is to provide a stainless steel sinker formed by using a process of powder metallurgy.

Another object of the present invention is to provide a sinker which may be quickly and easily attached and removed from a fishing line regardless of the conditions under which the sinker is being attached.

Another object of the present invention is to provide a generally spherical generally rigid stainless steel sinker having opposite V-shaped radial slots in the sinker, the radial slots being connected to one another by a bore hole extending through the center of the sinker.

Finally, an object to the present invention is to provide a stainless steel split-shot sinker which is relatively simple to manufacture, is easy to use and is safe for use in the environment.

SUMMARY OF THE INVENTION

The present invention provides a split-shot stainless steel sinker for attachment to a fishing line. The sinker includes a generally spherical, generally rigid body having a specific radius and first and second generally V-shaped radial slots in the body, the slots each having opposite end portions. The radial slots are arranged generally opposite one another on the body and each further include a base with a transverse extent sufficient to accept at least two runs of fishing lines side-by-side. A bore hole having opposite ends extend through the body between the first and second radial slots, and is generally colinear with a diameter of the generally spherical body. The ends of the bore hole and the end portions of the radial slots are curved or contoured such that fishing line running through the bore hole and the radial slots will not become frayed or kinked, resulting in a loss of line tensile strength.

In one embodiment, the radial slots each have a maximum depth of at least one-fourth (¼) the length of the radius of the spherical body and each radial slot further includes a base having sloping shoulders and a generally blunt section extending between such shoulders forming the base of the radial slot. In one embodiment, the sinker is formed of stainless steel, thus resulting in a rigid sinker which will not harm the environment.

The present invention thus provides a substantial improvement over those sinkers that aren't in the prior art. The relatively deep V-shaped radial slots in the sinker allow the sinker to be securely fastened to fishing line. Furthermore, the contoured ends of the bore hole and the contoured end portions of the radial slots cooperate to gradually curve the fishing line into the outer curvature of the spherical body. Fraying of the fishing line is thus prevented, as the fishing line encounters no sharp edges in its run around the sinker. Finally, the use of stainless steel instead of lead in manufacturing the sinker results in a longer-lived sinker which will not harm the environment should the sinker fall from the fishing line.

DESCRIPTION OF THE PREFERRED EMBODIMENT

Figure 1:
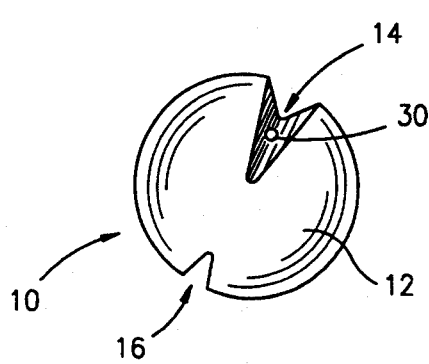
FIG. 1 is a perspective view of the split-shot sinker of the present invention.

The split-shot sinker 10 of the present invention shown in its preferred embodiment in FIGS. 1-5 as including a generally spherical solid body 12 having a top radial slot 14 and bottom radial slot 16. The solid body 12 is preferably constructed of stainless steel using a powder metallurgy fabrication process. Briefly, the formation of the sinker by powder metallurgy involves construction of a die having the desired spherical shape and injection of powdered stainless steel into the die. The powdered stainless steel is then compressed until the powder has been formed into the solid stainless steel sinker of the present invention. The die may be constructed to output a solid spherical body, or may include wedges and a vertical bar which will result in the solid body 12 having top and bottom radial slots 14 and 16 and center bore hole 30. However, while it is preferred that the split-shot sinker 10 of the present invention be constructed using the above-described metallurgy process, use of this process is not critical to the present invention. For example, the spherical solid body 12 may be formed by standard machining processes as may be the radial slots 14 and 16 and the bore hole 30.

Figure 2:
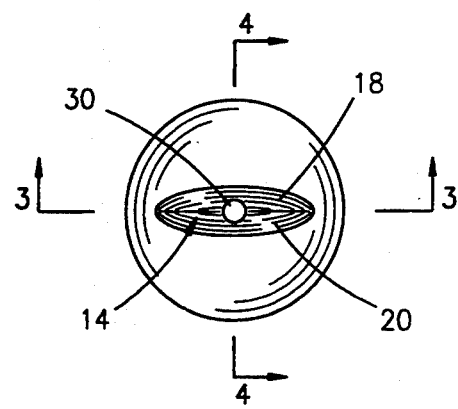
FIG. 2 is a top plan view of the sinker showing the top radial slot in the sinker.
Figure 3:
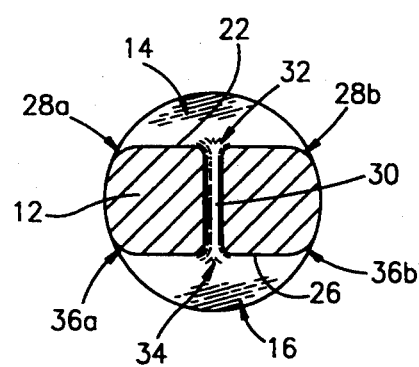
FIG. 3 is a side sectional elevational view of the sinker of the present invention taken along line 3—3 of FIG. 2 showing the contoured ends of the bore hole and contoured end portions of each radial slot which prevent fraying or kinking of the fishing line.
Figure 4:
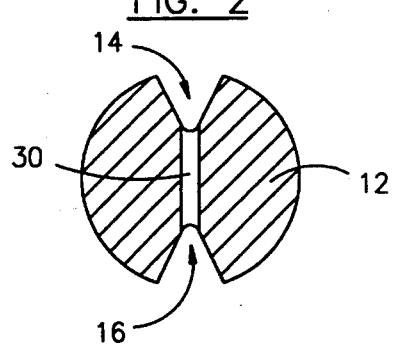
FIG. 4 is a side sectional elevational view of the sinker of the present invention taken along line 4—4 of FIG. 2.
Figure 5:
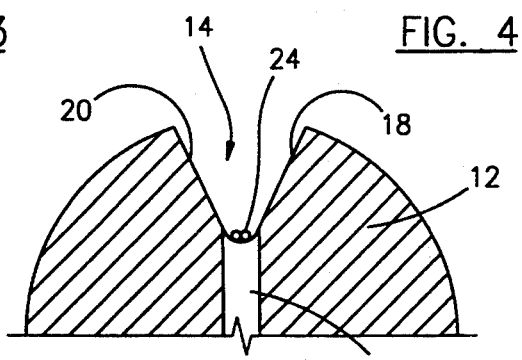
FIG. 5 is a partial detail side sectional elevational view of the sinker of the present invention showing two runs of fishing line at the bottom of the top radial slot.

The radial slots 14 and 16 are most clearly shown in FIGS. 1-5. The elements of top radial slot 14 will be described herein, and is to be understood that bottom radial slot 16 is substantially identical to top radial slot 14. The top radial slot 14 is best shown in FIGS. 1, 2, and 5 as including first and second slot faces 18 and 20 and a base 22 which extends between and connects the lower ends of each of the first and second slot faces 18 and 20. The base 22 is best shown in FIGS. 1 and 5 as consisting of a generally horizontal concave channel which extends along a chord of the spherical solid body 12. The concave shape of the base 22 allows fishing line 24 to extend along the base 22 without being pinched by the first and second slot faces 18 and 20. FIG. 5 shows that the base 22 is preferably of a size to accommodate two runs of fishing line 24 side-by-side without pinching either run of fishing line 24. Damage to the fishing line 24 is thus prevented.

It is preferred that the depth of the top radial slot 14 be at least one-fourth (¼) of the length of the radius of the spherical solid body 12. In the preferred embodiment of FIGS. 1-5, the depth of the top radial slot 14 is approximately one-half (½) of the length of the radius of the spherical file body 12. It is important that the radial slots 14 and 16 have a depths of at least one-fourth (¼) of the length of the radius of the spherical solid body 12 to prevent the fishing line 24 from accidentally being released from either radial slot 14 and 16. If the radial slots 14 and 16 are too shallow, such accidental release of the fishing 24 may occur frequently, thus resulting in the split-shot sinker 10 falling off of the fishing line 24 and being lost in the body of water which is being fished. It is also preferred that the radial slots 14 and 16 be of substantial width, as shown in FIGS. 2, 4 and 5 to allow a fisherman to quickly and easily insert the fishing line 24 into the slots 14 and 16. The width of the slots 14 and 16 is especially critical when the split-shot sinker 10 of the present invention is being used in adverse weather conditions, such as cold, rain, and/or snow.

FIGS. 3, 4 and 5 clearly display the bore hole 30 of the present invention. As was previously stated, the bore hole 30 may be formed during the injection molding process or may be subsequently formed by drilling through the split-sinker 10. It is preferred that the center bore hole 30 extend along a diameter of the spherical solid body 12, although the exact location of the bore hole 30 is not critical to the present invention so long as the bore hole extends between the top and bottom radial slots 14 and 16. FIG. 30 the bore hole 30 extends between and connects the top and bottom radial slots 14 and 16 such that the bore hole 30 is centrally located in each radial slot 14 and 16. It is preferred that the ends 32 and 34 of the bore hole 31 be contoured as shown in FIG. 3 such that each end 32 and 34 of the bore hole 30 is flared to gradually curve to join with the base 22 of the top radial slot 14 and base 26 of the bottom radial slot 16, respectively. The flared ends 32 and 34 of the bore hole 30 act to prevent fishing line 24 passing through the bore hole 31 from fraying or kinking due to any sharp edges or corners, as these have been eliminated.

Likewise, the end portions 28a and 28b of the top radial slot 14 and end portions 36a and 36b of the bottom radial slot 16 are contoured such that each end portion 28a, 28b, 36a and 36b curves to approximate the outer curvature of the spherical solid body 12. In this manner, fishing line 24 running along each base 22 and 26 of the top and bottom radial slots 14 and 16 will not become frayed or kinked due to contact with sharp corners or edges, as these have been eliminated by contouring end portions 28a, 28b, 36a and 36b.

It is to be understood that the flared ends 32 and 34 of the bore hole 30 and the contoured end portions 28a, 28b, 36a and 36b of the top and bottom radial slots 14 and 16 may be formed by standard machining processes, or may be integrally formed in the die such that the split-shot sinker 10 is formed with those curved sections. In the preferred embodiment, the top and bottom radial slots 14 and 16 do not connect with each other except through the bore hole 30. Therefore, fishing line 24 travels through the radial slots 14 and 16 and around the outer circumference of the solid body 12 when the sinker 10 is on the fishing line 24.

Figure 6:
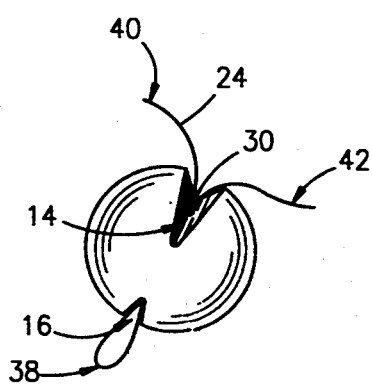
FIGS. 6-8 demonstrate how the sinker of the present invention is secured on a run of fishing line.
Figure 7:
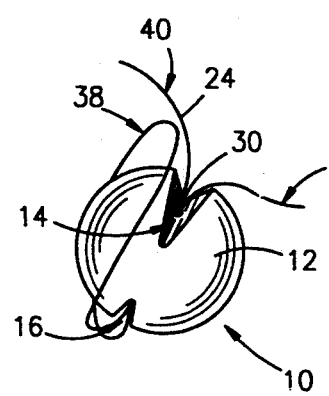
Figure 8:
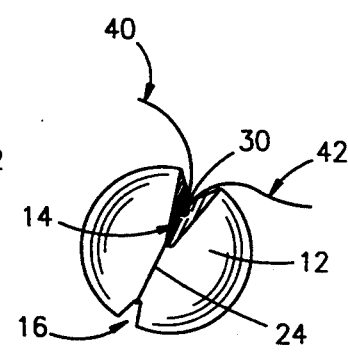

FIGS. 6–8 demonstrate the preferred method by which the split-shot sinker 10 of the present invention is affixed to a length of fishing line 24. First, a loop 38 is formed in the fishing line 24. The loop 3S is then flattened and extended through top radial slot 14 into the bore hole 30 and out of bottom radial slot 16, as shown in FIG. 6. The loop 38 is then widened and folded back upon itself such that the loop 38 of fishing line 24 extends around the outer circumference of the spherical solid body 12, as shown in FIG. 7. When the loop 38 is positioned over the top radial slot 14, the opposite ends 40 and 42 of the fishing line 24 are tensioned, thus pulling the loop 38 back through the bore hole 30. However, because the loop 38 is positioned around the spherical solid body 12, the loop 38 nestles within the top and bottom radial slots 14 and 16, as shown in FIG. 8. The loop 38 thus runs along each base 22 and 26 of the top and bottom radial slots 14 and 16 respectively. Additionally, due to the flared top and bottom ends 32 and 34 of the bore hole 30 and contoured end portions 28a, 28b, 36a and 36b of the top and bottom radial slots 14 and 16, the loop 38 of fishing line 24 will not become frayed or kinked, which can result in a loss of tensile strength of the fishing line 24. Of course, there are numerous other ways by which the split-shot sinker 10 of the present invention may be attached to fishing line 24, any of which may be used depending upon the person using the attachment method.

It is preferred that the split-shot sinker 10 be constructed of stainless steel for several reasons. First of all, stainless steel is non-toxic whereas lead is highly toxic. Secondly, stainless steel split-shot sinkers are rigid and therefore there is less chance that the sinker will fall off of the fishing line due to the sinker accidentally opening or being bent. Also, stainless steel is not substantially more expensive than lead, there will be no substantial increase in price for the consumer.

The split-shot sinker 10 of the present invention preferably would have weight between 1/32 of an ounce and 1 ounce, as these sizes are traditionally used for split-shot sinkers. Also, the sinker 10 would preferably have a diameter of between 1/16 of an inch and ¾ of an inch, depending upon the weight of the sinker 10. However, the exact size and mass of the sinker 10 is not critical to the invention.

The present invention thus provides a substantial improvement over the prior art. Since the split-shot sinker 10 of the present invention is not crimped onto fishing line, fishing line is undamaged by use of the present invention. Additionally, the securement method shown in FIG. 6–8 allows the sinker of the present invention to be used on fishing line without requiring that one end of the fishing line be free of the any hooks or lures, which is the case with many other kinds of sinkers. Finally, as stainless steel and lead have roughly similar densities, there is no appreciable change in the size of sinkers having similar mass when stainless steel is substituted for lead. Also, increased depth of the radial slots 14 and 16 allows for more secure placement of the sinker 10 on the fishing line 24.

It is to be understood that the present invention may be modified in numerous ways, such as by varying the size and shape of the radial slots and utilizing different construction materials and methods. However, it is also to be understood that the above description is not intended in any way to limit the scope of the present invention, which follows in the claims set forth below.

There has thus been set forth and described an invention which accomplishes at least all of the stated objectives.

We claim:

1. A sinker for attachment to a fishing line comprising;
   a generally spherical, generally rigid solid body having a radius;
   first and second generally V-shaped radial slots in said solid body, each having opposite end portions;
   said radial slots each further including a base with a transverse extent defining a generally blunt section for receipt of at least two runs of said fishing line side-by-side;
   a bore hole having opposite ends and extending through said body and between said first and second radial slots; and
   said ends of said bore hole and said end portions of said radial slots being contoured such that fishing line running through said bore hole and said radial slots is prevented from being frayed and kinked, resulting in a loss of line tensile strength.

2. The sinker of claim 1 wherein said solid body is constructed of stainless steel.

3. The sinker of claim 1 wherein each of said first and second generally V-shaped radial slots have a maximum depth of at least one-fourth (¼) the length of said radius of said body.

4. The sinker of claim 1 wherein each of said bases of said radial slots each comprise a generally horizontal concave channel extending along a chord of said solid body.

5. The sinker of claim 1 wherein said ends of said bore hole are flared to gradually curve to join with a respective base of said radial slot, thereby preventing fraying and kinking of fishing line through contact with said ends of said bore hole.

6. The sinker of claim 1 wherein said end portions of said radial slots are contoured such that each of said end portions curves to connect said bases of said radial slots with the outer curvature of said solid body, thereby preventing fraying and kinking of fishing line due to contact with said end portions.

7. A sinker for attachment to a fishing line comprising;

a generally spherical, generally rigid body having a radius;

first and second generally V-shaped radial slots in said body, said slots each having opposite end portions;

said radial slots arranged generally opposite one another on said body;

said radial slots each having a maximum depth of at least one-fourth (¼) the length of said radius of said body;

said radial slots each further including a base having sloping shoulders and a generally blunt section extending between said shoulders;

a bore hole having opposite ends and extending through said body between said first and second radial slots; and said ends of said bore hole and said end portions of said radial slots being contoured such that fishing line running through said bore hole and said radial slots is prevented from 14 becoming frayed and kinked, resulting in a loss of line tensile strength.

* * * * *